United States Patent [19]

Takeda et al.

[11] Patent Number: 4,724,497
[45] Date of Patent: Feb. 9, 1988

[54] EJECT BUTTON UNIT FOR A DISK RECORDING AND REPRODUCING DEVICE

[75] Inventors: Kuninobu Takeda; Osamu Shigenai, both of Furukawa, Japan

[73] Assignee: Alps Electric Co., Ltd., Japan

[21] Appl. No.: 738,096

[22] Filed: May 24, 1985

[30] Foreign Application Priority Data

May 25, 1984 [JP] Japan .............................. 59-75742[U]

[51] Int. Cl.$^4$ .............................................. G11B 17/04
[52] U.S. Cl. ........................................ 360/97; 360/99
[58] Field of Search ..................... 360/97, 99, 104–105

[56] References Cited

U.S. PATENT DOCUMENTS 4,562,498 12/1985 Shibata ................................... 360/97
4,573,093 2/1986 Obama et al. ..................... 360/99 X

FOREIGN PATENT DOCUMENTS

60-63761 4/1985 Japan ..................................... 360/97

Primary Examiner—Stuart N. Hecker
Assistant Examiner—Alyssa H. Bowler
Attorney, Agent, or Firm—Guy W. Shoup

[57] ABSTRACT

A disk recording and reproducing device includes a chassis, a front panel mounted on a front side of the chassis, a disk holder movably mounted on the chassis for holding an information storage disk, and an eject button unit for operating the disk holder to allow the information storage disk to be ejected therefrom, the eject button unit being lockingly mounted on the chassis and having a portion projecting through the front panel. The eject button unit is mounted in place on the chassis before the front panel is attached thereto.

5 Claims, 20 Drawing Figures

EJECT BUTTON UNIT FOR A DISK RECORDING AND REPRODUCING DEVICE

BACKGROUND OF THE INVENTION

The present invention relates to a disk recording and reproducing device for recording and reproducing information in and from magnetic or optical disks.

Conventional disk recording and reproducing devices have an eject controller such as a push button retained in position by a front panel. Front panels for the disk recording and reproducing devices may be of different designs from device type to device type, or may be composed of front panels of system devices. Therefore, the eject controller, unlike other parts, cannot be attached in place until a final assembling step, resulting in a comlex assembling process.

SUMMARY OF THE INVENTION

It is an object of the present invention to provide a disk recording and reproducing device having an eject controller which can be assembled together with other parts in a highly efficient assembling process.

Another object of the present invention is to provide a disk recording and reproducing device having an eject controller retained on a chassis and serving as a guide and positioner upon attaching a front panel or assembling the disk recording and reproducing device in a system device, so that the front panel or the disk recording and reproducing device can be attached or assembled to a nicety.

Still another object of the present invention is to provide a disk recording and reproducing device having a unit composed of an eject button, a button holder, a slide, and a button return spring and attached to a chassis, so that these components can easily be assembled with a high accuracy.

According to the present invention, there is provided a disk recording and reproducing device including a chassis, a front panel mounted on a front side of the chassis, a disk holder movably mounted on the chassis for holding an information storage disk, and an eject button uni for operating the disk holder to allow the information storage disk to be ejected therefrom, the eject button unit being lockingly mounted on the chassis and having a portion projecting through the front panel.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
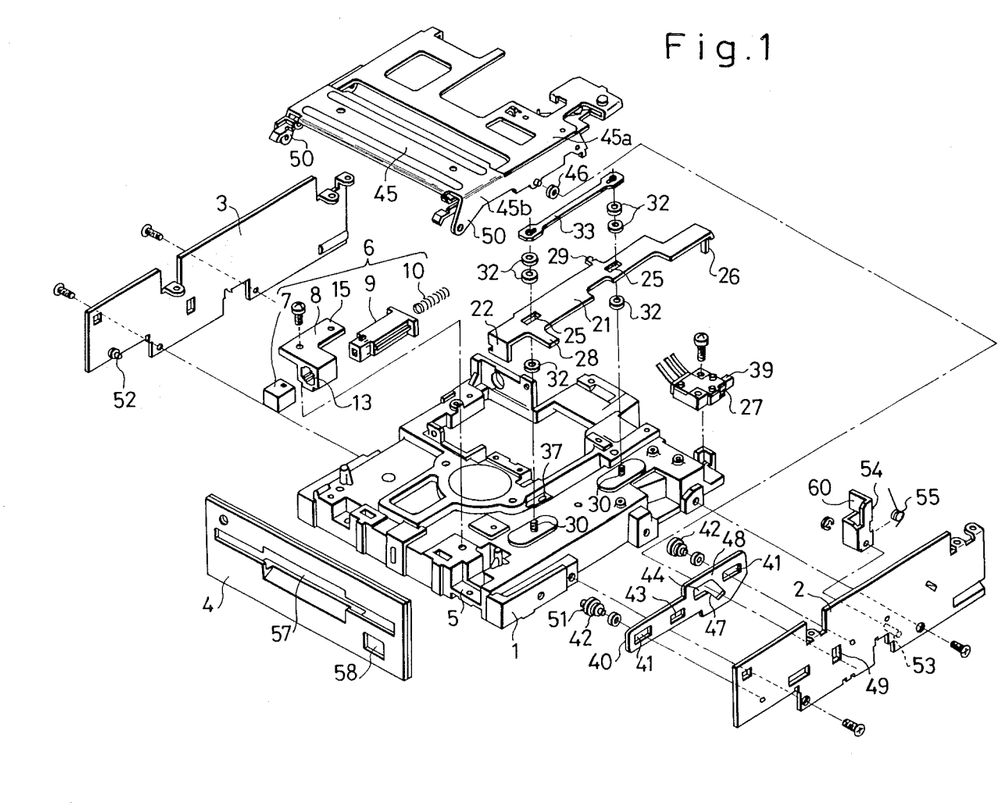
FIG. 1 is an exploded perspective view of a disk recording and reproducing device according to the present invention.

As illustrated in FIG. 1, a disk recording and reproducing device according to the present invention has a chassis 1 comprising an aluminum die casting, first and second side panels 2, 3 attached to opposite sides of the chassis 1, and a front panel 4 attached to a front side of the chassis 1. Since the front panel 4 has a front design which varies from device type to device type, the front panel 4 is attached to the chassis 1 in a final assembling process for the disk recording and reproducing device. Alternatively, where the disk recording and reproducing device is to be assembled in a system device such as a computer, a front panel of the system device doubles as part of that of the disk recording and reproducing device.

The chassis 1 has in its front side a recess 5 in which an eject button unit 6 is accommodated. The eject button unit 6 is composed of an eject button 7, a button holder 8, a slide 9, and a button return spring 10.

Figure 2:
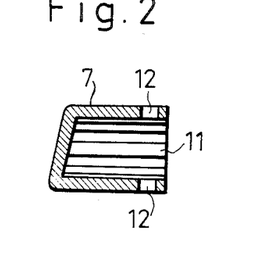
FIG. 2 is a sectional side elevational view of an eject button.
Figure 3:
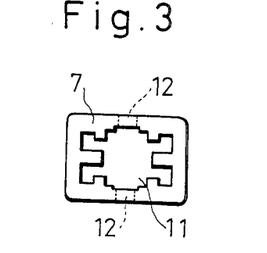
FIG. 3 is a rear elevational view of the eject button.

FIGS. 2 and 3 are illustrative of the eject button 7. The eject button 7 has a cavity 11 opening in its rear end so that a front end of the slide 9 can be force-fitted into the cavity 11. The eject button 7 also has locking holes 12 defined in upper and lower sufaces thereof and communicating with the cavity 11.

Figure 4:
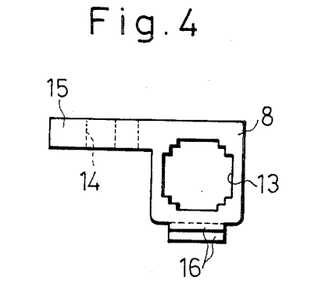
FIG. 4 is a front elevational view of a button holder.
Figure 5:
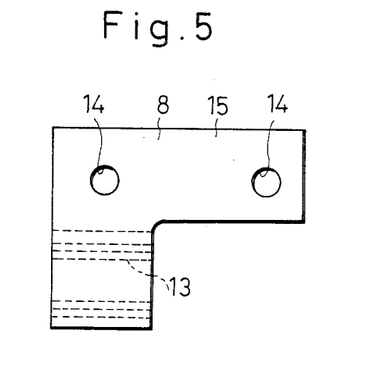
FIG. 5 is a plan view of the button holder.
Figure 6:
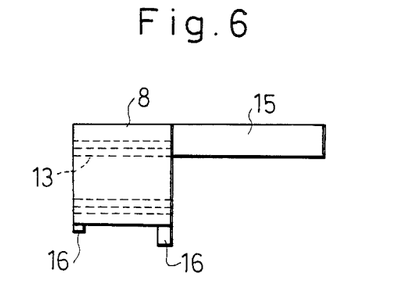
FIG. 6 is a side elevational view of the button holder.
Figures 7, 8:
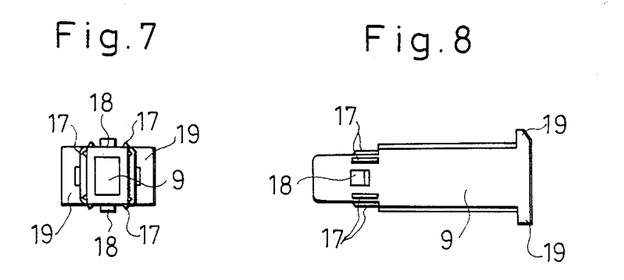
FIG. 7 is a front elevational view of a slide.
FIG. 8 is a plan view of the slide.

FIGS. 4, 5, and 6 show the button holder 8. The button holder 8 has a guide hole 13 defined therethrough and includes an upper attachment 15 extending laterally and having attachment holes 14. The button holder 9 also has front and rear stoppers 16 projecting downwardly from a lower surface thereof.

Figure 9:
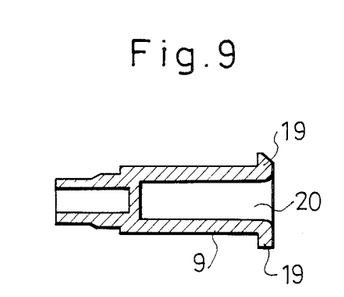
FIG. 9 is a sectional plan view of the slide.
Figure 10:
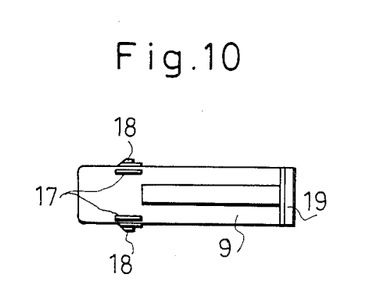
FIG. 10 is a side elevational view of the slide.

FIGS. 7, 8, 9, and 10 illustrate the slide 9. The slide 9 has a plurality of ridges 17 of triangular cross section on sides of a front end thereof, and locking teeth 18 on upper and lower surfaces thereof. The slide 9 also has locking flanges 19 on a rear end thereof. As shown in FIG. 9, the slide 9 includes a spring housing hole 20 defined therein and opening in the rear end thereof.

Figure 11:
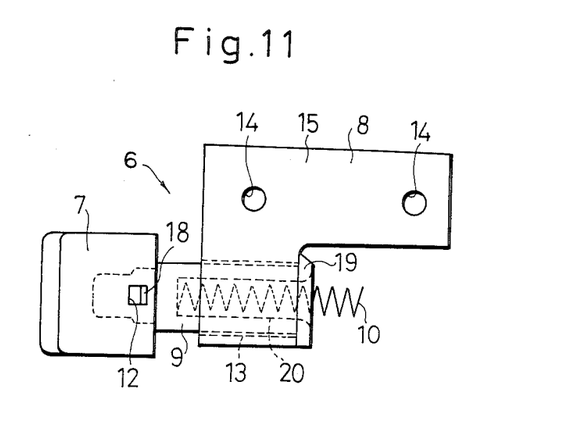
FIG. 11 is a plan view of an eject button unit.

Assembling of the eject button unit 6 will be described with reference to FIGS. 11 and 12. As illustrated in FIG. 11, the front end of the slide 9 is inserted into the guide hole 13 in the button holder 8 until the flanges 19 abut against an end face of the button holder 8 and the front end of the slide 9 projects foward from the button holder 8. The front end of the slide 9 is then force-fitted into the cavity 11 in the button 7 until the locking teeth 18 are locked in the locking holes 12, respectively, in the button 7. When the front end of the slide 9 is forcibly inserted into the cavity 11, the ridges 17 on the slide 9 locally contact inner surfaces of the cavity 11 under high contact pressure. Such pressed engagement of the riges 17 with the inner surfaces of the cavity 11, together with the engagement of the locking teeth 18 in the locking holes 12, retain the button 7 and the slide 9 firmly together, and the assembly is slidably supported on the button holder 8.

Then, the button return spring 10 is pushed under compression into the spring housing hole 20 in the slide 9. The assembled eject button unit 6 is now inserted in the recess 5 in the chassis 1 as shown in FIG. 12. Before the eject button unit 6 is inserted in place, an eject lever 21 is slidably mounted on the chassis 1 and has its front end bent into a spring seat 22 which is inserted in the recess 5.

Figure 12:
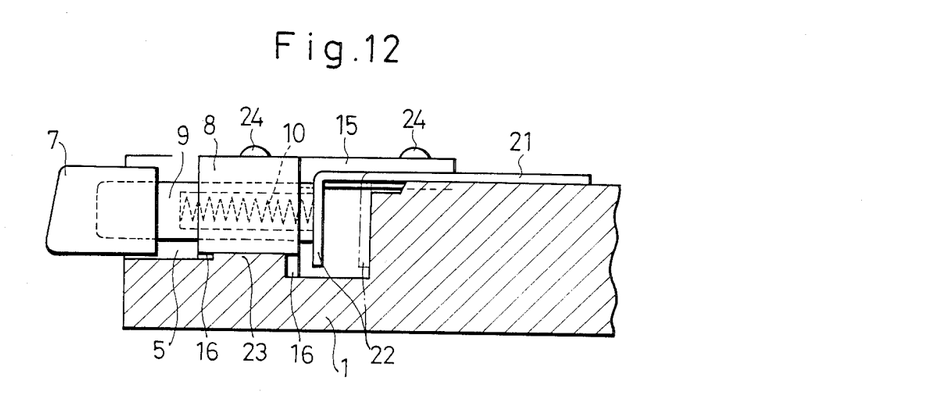
FIG. 12 is a side elevational view of the eject button unit as mounted in place.

As shown in FIG. 12, the button of the recess 5 has a positioning land 23 with its front and rear edges engaging the stoppers 16, 16, respectively, of the button holder 8. The attachment 15 of the button holder 8 is fixed to the chassis 1 by screws 24. The eject button unit 6 is now fixed in position to the chassis 1. The button return spring 10 has a rear end resiliently seated on the spring seat 22 of the eject lever 21. The assembly of the eject button 7 and the slide 9 is urged forward without relative wobbling movement under the resilient force of the spring 10.

Figure 13:
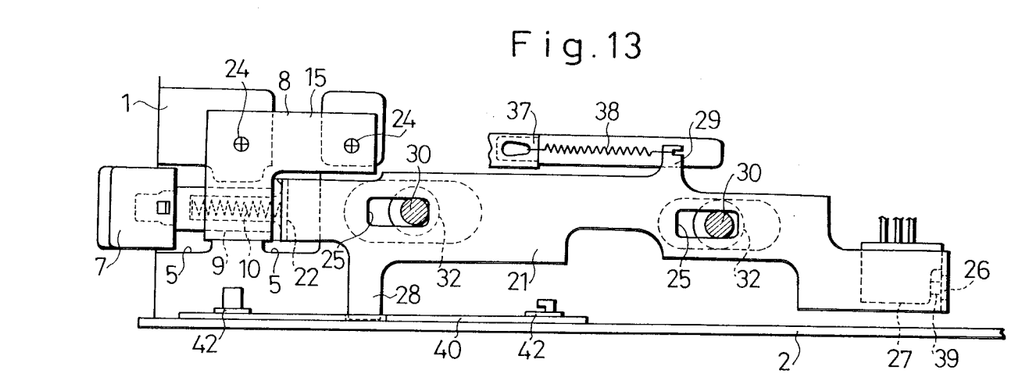
FIG. 13 is a plan view of an eject lever as located in a standby position.

As illustrated in FIG. 13, the eject lever 21 has two oblong holes 25, 25 defined therein and spaced from each other a certain distance in the longitudinal direction thereof in which the eject lever 21 is slidable. The spring seat 22 projects downwardly from the front end of the eject lever 21, which has a switch operating member 26 projecting downwardly from a rear end thereof. As shown in FIG. 1, the switch operating member 26 is narrower than other portions of the eject lever 21 so that the switch operating member 26 can be bent relatively easily for adjusting the timing of contacting engagement between the switch operating member 26 and a microswitch 27 (described later), that is, the timing of opening and closing of contacts of the microswitch 27, after the device has been assembled.

The eject lever 21 also has an engagement tongue 28 extending toward the first side panel 2, and a spring retainer 29 extending away from the engagement tongue 28.

Figure 15:
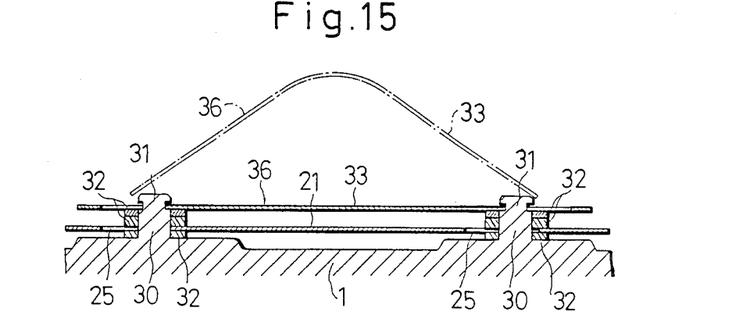
FIG. 15 is a fragmentary cross-sectional view of the ejec lever mounted in place.
Figure 16:
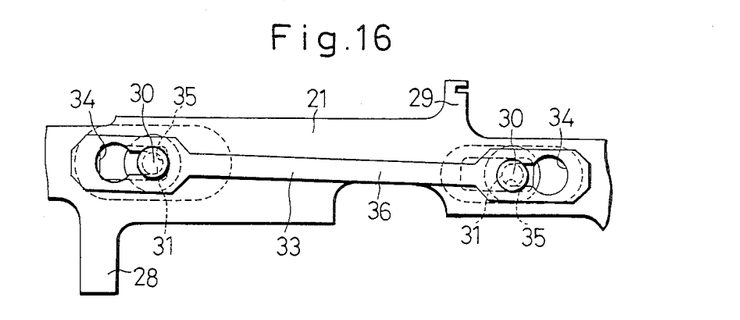
FIG. 16 is a fragmentary plan view of the eject lever mounted in place.

Attachment of the eject lever 21 to the chassis 1 will be described with reference to FIGS. 15 and 16. As shown in FIG. 15, two guide posts 30, 30 project upwardly from the chassis 1 for insertion through the respective oblong holes 25, 25 in the eject lever 21, each of the guide posts 30, 30 having a smaller-diameter portion 31 in the form of a circumferential groove near an upper end thereof. As illustrated in FIGS. 1 and 15, a plurality of washers 32 and the eject lever 21 are successively fitted over the guide posts 30, and then a retainer plate 33 is mounted on the guide posts 30, 30. The retainer plate 33 is made of a resilient thin metal sheet and has wider apertures 34 in opposite ends thereof which are wide enough to allow heads of the guide posts 30 to pass freely therethough and narrower apertures 35 communiating with the wider apertures 34 and disposed inwardly thereof, the narrower apertures 35 having a width which is substantially the same as the diameter of the smaller-diameter portions 31 of the guide posts 30. The narrower apertures 35 are spaced from each other a distance which is substantially the same as or slightly smaller than the distance between the smaller-diameter portions 31. The opposite ends of the retainer plate 33 are interconnected by an intermediate connector 36 which is relatively narrow so as to be bendable easily.

As indicated by the dot-and-dash lines in FIG. 15, the intermediate connector 36 of the retainer plate 33 is bent upwardly with the ends of the retainer plate 33 located downwardly, and the wider apertures 34 are positioned above the guide posts 30. Then, the retainer plate 33 is lowered until the heads of the guide posts 30 enter the wider apertures 34, whereupon the retainer plate 33 is released. The retainer plate 33 springs back to the flat shape as indicated by the solid lines in FIG. 15 to cause the narrower apertures 35 to fit over the smaller-diameter portions 31. Thus, the eject lever 21 is locked by the retainer plate 33 against removal.

Figure 17:
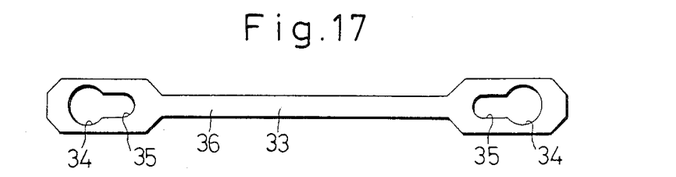
FIG. 17 is a plan view of a retainer plate.
Figure 18:
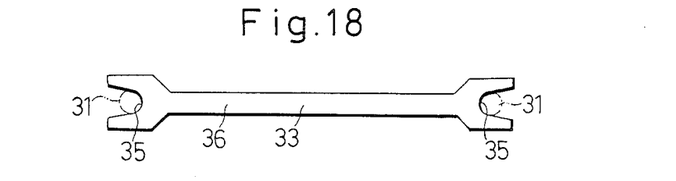
FIG. 18 is a plan view of a modified retainer plate.

FIG. 18 shows a modification of the retainer plate 33. The modified retainer plate 33 includes wide apertures 35 defined in opposite ends thereof and progressively spreading outwardly. The modified retainer plate 33 can be attached in the same manner as the retainer plate 33 of FIG. 17 is mounted. As assembled, the wide apertures 35 are fitted over the smaller-diameter portions 30 of the guide posts 30.

As shown in FIG. 13, a tension spring 38 engages the spring retainer 29 of the retainer plate 33 and a spring retainer 37 on the chassis 1 for normally urging the eject lever 21 in a direction toward an eject standby position. The microswitch 27 is positioned rearwardly and downwardly of the eject lever 21 and has an actuator 39 disposed in confronting relation to the switch operating member 26.

Figure 19:
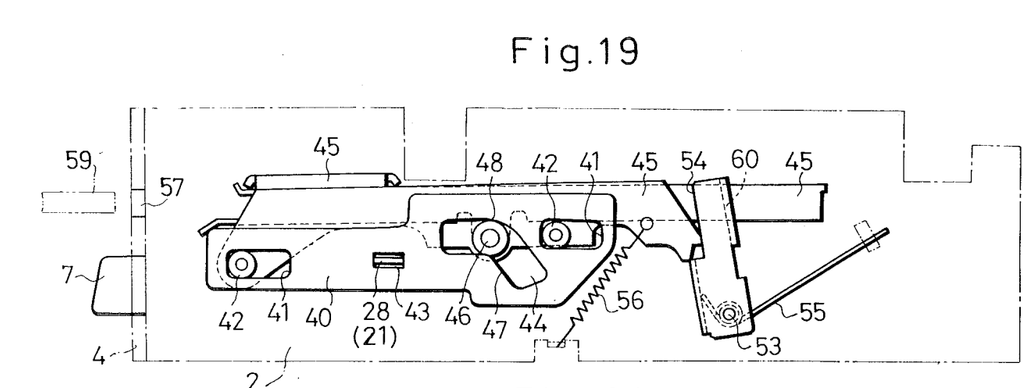
FIGS. 19 and 20 are side elevational views showing the manner in which a slide plate operates.

The eject lever 21 is movable in ganged relation to a slide plate 40. As illustrated in FIGS. 1 and 19, the slide plate 40 has two oblong holes 41, 41 defined therein and spaced at a certain interval in the longitudinal direction thereof in which the slide plate 40 is slidable. Rollers 42 disposed respectively in the oblong holes 41 are rotatably mounted on an inner surface of the first side panel 2, so that the slide plate 40 is slidably supported on the first side panel 2 by the rollers 42 in the oblong holes 41.

The slide plate 40 also has an engagement hole 43 defined therein between the oblong holes 41, 41. The engagment tongue 28 of the eject lever 21 is fitted in the hole 43 to connect the eject lever 21 and the slide plate 40 together.

The slide plate 40 has an angular cam slot 44 having a lower slanted edge 47 serving as a lifting cam surface and an upper curved edge 48 serving as a engaging cam surface. As shown in FIG. 1, the first side panel 2 has a vertical restricting groove 49 defined therein in confronting relation to the cam slot 44 in the slide plate 40. A disk holder 45 has an outer side wall centrally on which there is rotatably supported an up-down roller 46 having an inner half inerted in the cam slot 44 and an outer half inserted in the restricting groove 49. The disk holder 49 has front ends 50 one angulraly movably supported on a shaft 51 of the front roller 42 and the other angularly movably supported on a shaft 52 projecting from an inner surface of the second side panel 3. The disk holder 45 comprises a swing holder 45a and a load lever 45b.

A lock lever 54 is angularly movably supported by a shaft 53 on an inner rear surface of the first side panel 2. The lock lever 54 is normally urged by a helical torsion spring 55 in a direction to turn forwardly or counterclockwise in FIG. 19.

Figure 20:
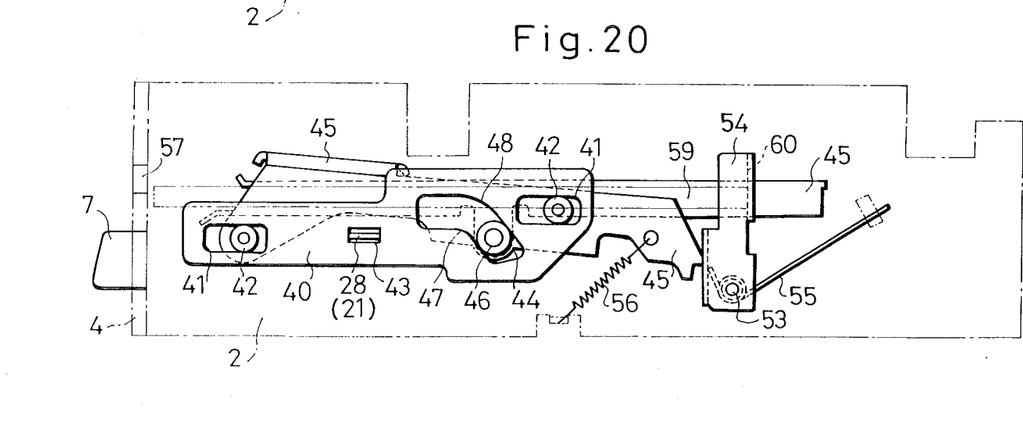

In FIGS. 19 and 20, a tension spring 56 acts between the first side panel 2 and the disk holder 45 for normally urging the disk holder 45 in a direction toward a load position.

Although not shown, the chassis 1 supports thereon a disk drive mechanism, a mechansim for feeding a carriage on which a magnetic head is mounted, and a circuit board. In a final assembling stage, the front panel 4 (FIG. 1) is mounted on the front side of the chassis 1. The front panel 4 has a disk insertion slot 57 and a button insertion opening 58 defined therein. By attaching the front panel 4 to the chassis 1, the center of the eject button 7 mounted and locked on the chassis 1 is well aligned with the center of the button insertion opening 56, so that the eject button 7 is inserted centrally in the button insertion opening 56 without positional deviation.

Operation of the disk recording and reproducing device up to insertion of a magnetic disk cartridge 59 into the load position will now be described. FIG. 19 shows the position of the parts prior to insertion of the magnetic disk cartridge 59. At this time, the disk holder 45 is in an unload position (upper position) in alignment with the disk insertion slot 57 in the front panel 4, with the rear end of the disk holder 45 engaging the lock lever 54 and positioned thereby. The slide plate 40 together with the eject lever 21 is pushed in a rearmost eject position against the resiliency of the tension spring 38 (FIG. 14), and the up-down roller 46 is positioned between an upper end of the lifting cam surface 47 and the engaging cam surface 48. With the up-down roller 46 thus positioned, the slide plate 40 and the eject lever 21 are held in the eject position without being moved back to the eject standby position, through the engagement between the up-down roller 46 and the engaging cam surface 48.

Figure 14:
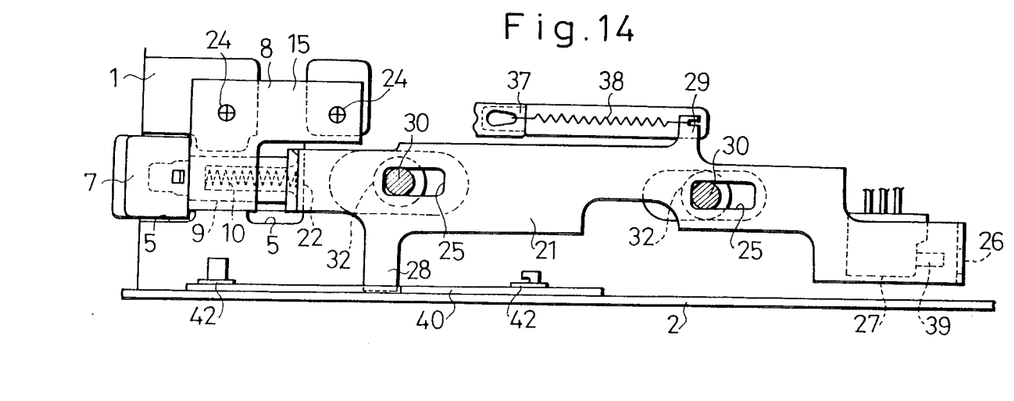
FIG. 14 is a plan view of the eject lever as located in an ejected position.

As the eject lever 21 is held in the eject position, the switch operating member 26 is spaced from the actuator 39 of the microswitch 27 in the same manner as shown in FIG. 14. The microswitch 27 is then turned off. Although the eject lever 21 is in the rear eject position, the eject button 7 projects forwardly from the front panel 4 under the resiliency of the button return spring 10.

Now, the magnetic disk cartridge 59 is inserted through the insertion slot 57 into the disk holder 45. Just before the magnetic disk cartridge 59 is completely inserted, the leading edge of the magnetic disk cartridge 59 engages an abutment surface 60 (FIG. 1) of the lock lever 54. Continued insertion of the magnetic disk cartridge 59 turns the lock lever 59 clockwise against the resiliency of the helical torsion spring 55. Immediately after the magnetic disk cartridge 59 has been inserted, the disk holder 45 is disengaged from the lock lever 54.

The disk holder 45 is now released and pulled downwardly under the force of the tension spring 56 as shown in FIF. 20. The downward movement of the disk holder 45 causes the up-down roller 46 to be lowered off the engaging cam surface 48 while being guided by the restricting groove 49 (FIG. 1) in the first side panel 2. The slide plate 40 is released, and withdrawn together with the eject lever 21 back to the eject standby position (front position) under the force of the tension spring 38 (FIG. 13). Upon return of the eject lever 21, the switch actuating member 26 engage and moves the actuator 39 to close the contacts of the microswitch 27, which then issues a set signal indicating that the magnetic disk cartridge 59 is located in the load position. Thereafter, information is written on or read out of the disk.

The magnetic disk cartridge 59 will be ejected out of the device in the following manner:

When the eject button 7 is depressed in FIG. 13, the slide 9 causes the eject lever 21 to move rearwardly (to the right as shown) as illustrated in FIG. 14. The switch operating member 26 is released from the actuator 39, whereupon the microswitch 27 is turned off and produces no signal. FIG. 14 shows the eject lever 21 as pushed to the eject position.

On the movement of the eject lever 21, the slide plate 40 also moves rearwardly to cause the up-down roller 46 to be lifted by the slanted surface of the lifting cam slot 47 and the restricting groove 49 in the first side panel 2. The disk holder 45 housing the magnetic disk cartridge 59 therein is then moved from the load position to the unload position against the resilient force of the tension spring 56. When the disk holder 45 engages the lock lever 54 as shown in FIG. 19, the up-down roller 46 reaches an upper end of the lifting cam slot 47 to engage the engaging cam surface 48. The disk holder 45 is now held in the unload position, while the eject lever 21 and the slide plate 40 are held in the eject position. The magnetic disk cart idge 59 is then ejected forwardly through the insertion slot 57 by a known eject mechanism (not shown).

Although a certain preferred embodiment has been shown and described, it should be understood that many changes and modifications may be made therein without departing from the scope of the appended claims.

What is claimed is:

1. A disk recording and reproducing device comprising:
   (a) a chassis;
   (b) a front panel mounted on a front side of said chassis and having a hole therein for allowing an eject buttdn to project therethrough;
   (c) a disk holder movably mounted on said chassis for holding an information storage disk, said disk holder being movable between an eject position and in loaded position;
   (d) an eject means including a slide mounted on said chassis and having a portion connected to said disk holder for releasing said disk holder from the loaded position to the eject position; and
   (e) an eject button unit mounted on said chassis having means for lockingly mounting an eject button on a front end of said slide independently of said front panel such that said button can be assembled to said slide on said chassis and then said front panel can be assembled thereto with said button projected through said hole in said front panel.

2. A disk recording and reproducing device according to claim 1, wherein said eject button unit comprises a button holder mounted on said chassis, a slide coupled to said eject botton and slidably extending through said button holder, said slide having a portion for operating said disk holder, and a spring for normally urging said eject button in a direction to project from said front panel.

3. A magnetic recording and reproducing device according to claim 2, wherein said eject button has a rearwardly opening cavity, said slide having a front end force-fitted in said cavity in said eject button and at least one flange on a rear end thereof, said button holder having a guide hole,through which said button holder is slidably disposed, said flange of said slide being engageable with said button holder.

4. A magnetic recording and reproducing device according to claim 3, wherein said eject button has at least one locking hole defined therein in communication with said cavity, said slide having at least one locking tooth engaging in said locking hole.

5. A magnetic recording and reproducing device according to claim 3, wherein said slide has a plurality of ridges engaging inner surfaces defining said cavity in the eject button.

* * * * *